(12) United States Patent
Dakroub et al.

(10) Patent No.: US 8,804,272 B1
(45) Date of Patent: Aug. 12, 2014

(54) CLEARANCE SENSOR AND CIRCUITRY USING ADJUSTABLE CHANNEL PARAMETERS

(71) Applicant: Seagate Technology LLC, Cupertino, CA (US)

(72) Inventors: Housan Dakroub, Shakopee, MN (US); Edward Charles Gage, Lakeville, MN (US); Tim Rausch, Farmington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/932,398

(22) Filed: Jul. 1, 2013

(51) Int. Cl.
*G11B 21/02* (2006.01)

(52) U.S. Cl.
USPC .................... 360/75; 360/69; 360/59; 360/46

(58) Field of Classification Search
None
See application file for complete search history.

(56) References Cited

U.S. PATENT DOCUMENTS

| | | | |
|---|---|---|---|
| 6,262,572 B1 | 7/2001 | Franco et al. | |
| 7,042,674 B1 | 5/2006 | Baril et al. | |
| 7,119,995 B2 | 10/2006 | Granstrom et al. | |
| 7,193,824 B2 | 3/2007 | Naka | |
| 7,317,597 B2 | 1/2008 | Naka | |
| 7,362,534 B1 | 4/2008 | Schreck et al. | |
| 7,502,205 B1 | 3/2009 | Hurtado et al. | |
| 7,667,456 B2 | 2/2010 | Naka | |
| 7,800,858 B1 * | 9/2010 | Bajikar et al. | 360/75 |
| 7,936,538 B1 | 5/2011 | Zhang et al. | |
| 8,297,113 B2 | 10/2012 | Liners et al. | |
| 2005/0162785 A1 | 7/2005 | Granstrom et al. | |
| 2006/0185261 A1 | 8/2006 | Ashton et al. | |
| 2008/0218891 A1 | 9/2008 | Gubbins et al. | |
| 2008/0225426 A1 * | 9/2008 | Roy et al. | 360/31 |
| 2010/0116816 A1 | 5/2010 | Ashton et al. | |
| 2011/0228651 A1 | 9/2011 | Gage et al. | |
| 2012/0113207 A1 | 5/2012 | Zheng | |
| 2012/0120519 A1 | 5/2012 | Kunkel et al. | |
| 2012/0120522 A1 | 5/2012 | Johnson et al. | |
| 2012/0120527 A1 | 5/2012 | Kunkel et al. | |
| 2012/0120982 A1 | 5/2012 | Anaya-Dufresne et al. | |
| 2012/0201108 A1 | 8/2012 | Zheng et al. | |

* cited by examiner

*Primary Examiner* — Muhammad N Edun
(74) *Attorney, Agent, or Firm* — Hollingsworth Davis, LLC (57) ABSTRACT

A transducer is configured to interact with a magnetic storage medium, a first channel comprises a first sensor and first circuitry configured to adjust a plurality of first channel parameters, and a second channel comprises a second sensor and second circuitry configured to adjust a plurality of second channel parameters. The first and second channel parameters are independently adjustable by the first and second circuitry, respectively. A detector is coupled to the first and second channels, and configured to detect a head-medium interface event.

20 Claims, 9 Drawing Sheets

CLEARANCE SENSOR AND CIRCUITRY USING ADJUSTABLE CHANNEL PARAMETERS

SUMMARY

Embodiments of the disclosure are directed to an apparatus comprising a transducer configured to interact with a magnetic storage medium, a first channel comprising a first sensor and first circuitry configured to adjust a plurality of first channel parameters, and a second channel comprising a second sensor and second circuitry configured to adjust a plurality of second channel parameters. The first and second channel parameters are independently adjustable by the first and second circuitry, respectively. A detector is coupled to the first and second channels, and configured to detect a head-medium interface event.

Embodiments are directed to an apparatus comprising a transducer configured to interact with a magnetic storage medium. The transducer includes a plurality of bond pads, each of which serves as a voltage or current source contact. A first sensor, having a temperature coefficient of resistance, comprises a first end coupled to a first bond pad and a second end coupled to ground. A second sensor, having a temperature coefficient of resistance, comprises a first end coupled to a second bond pad and a second end coupled to ground. Preamplifier circuitry comprises first channel circuitry coupled to the first sensor and second channel circuitry coupled to the second sensor. The first channel circuitry is configured to provide adjustment of a plurality of first channel parameters and the second channel circuitry is configured to provide adjustment of a plurality of second channel parameters. The first and second channel parameters are independently adjustable by the first and second circuitry, respectively. A detector is coupled to the preamplifier circuitry and configured to detect a head-medium interface event.

Embodiments are directed to a method which involves sensing a first head-medium interface signal with a first thermal sensor coupled to a first channel, and sensing a second head-medium interface signal with a second sensor coupled to a second channel. The method also involves adjusting first parameters of the first channel and adjusting second parameters of the second channel independently of adjusting the first parameters. The method further involves detecting a head-medium interface event using the first and second head-medium interface signals.

These and other features and aspects of various embodiments may be understood in view of the following detailed discussion and accompanying drawings.

DETAILED DESCRIPTION

Data storage systems commonly include one or more transducers that write and read information to and from a magnetic storage medium. It is typically desirable to have a relatively small distance or spacing between a transducer and its associated medium. This distance or spacing is known as "fly height" or "head-media spacing." By reducing the head-media spacing, a transducer is typically better able to both write and read data to and from a medium. Increasing areal density requires reduced head-to-media spacing. Reducing the head-media spacing also allows for surveying of magnetic storage medium topography, such as for detecting asperities, voids, and other features of the medium surface.

Head-medium spacing (e.g., clearance) and/or contact detection technologies are important for the performance and reliability of magnetic storage systems. Higher contact detection repeatability enables lower active clearance, and thus higher recording density. Higher contact detection sensitivity reduces wear and improves reliability. Head-medium contact and thermal asperity detection can be achieved using sensors situated at or near an airbearing surface of a transducer. The efficacy of detecting head-media and thermal asperity contact events can be enhanced by controllably adjusting various channel parameters in accordance with embodiments of the disclosure.

In accordance with various embodiments, the sensors are configured to sense for a head-medium interface event or clearance control trigger (collectively referred to as head-medium interface event, i.e., HMI events), such as head-medium contact, thermal asperity contact, encountering a void in the medium, and head-medium clearance or change in clearance, for example. In some embodiments, the sensors are implemented as thermal sensors, such as resistance thermal sensors, thermistors, and thermocouples, for example. Various embodiments disclosed herein are directed to sensors having a temperature coefficient of resistance (referred to herein as TCR sensors), it being understood that other sensor technologies are contemplated. TCR sensors used for head-medium contact detection typically employ metals such as Cr or NiFe for the thermal sensing elements.

Figures 1, 2, 3:
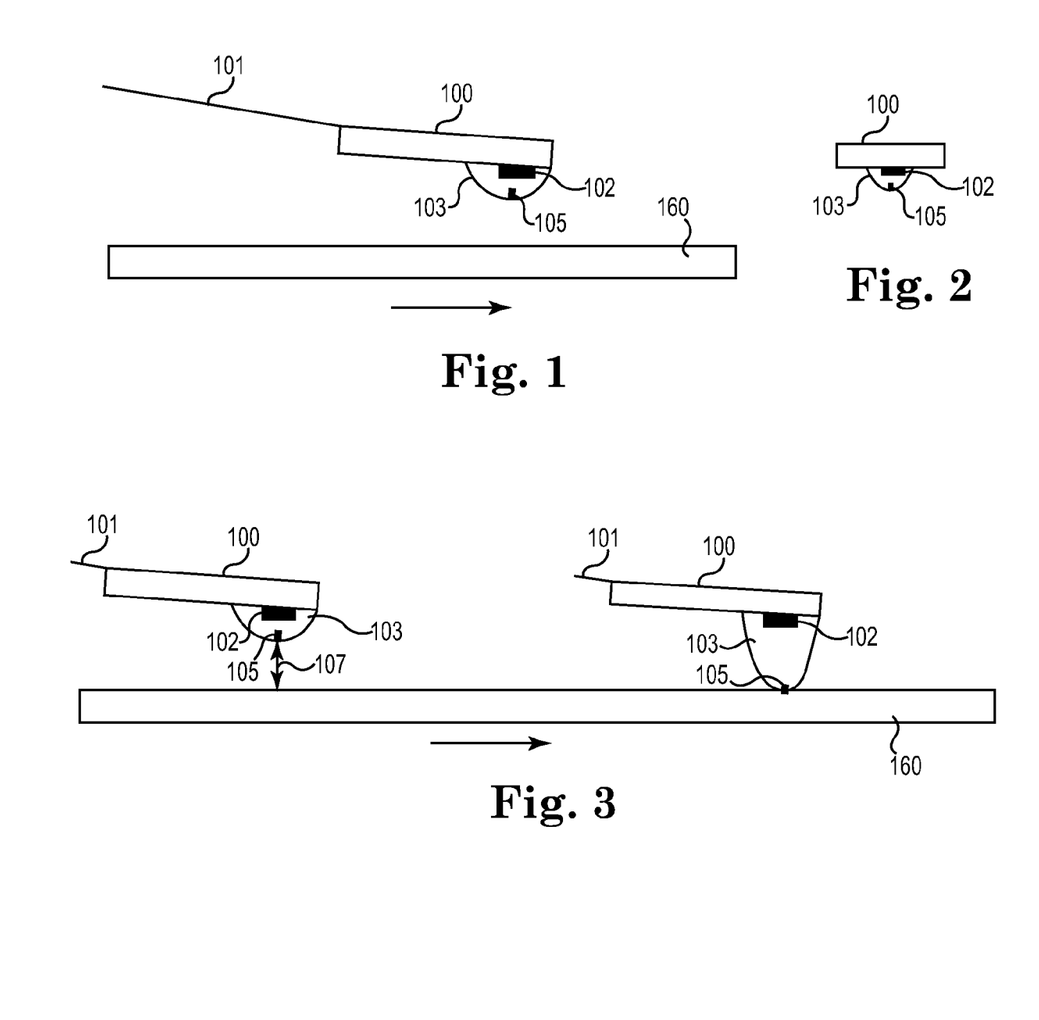
FIG. 1 is a simplified side view of a heater-actuated transducer arrangement which incorporates a thermal sensor in accordance with various embodiments.
FIG. 2 is a front view of the heater-actuated transducer arrangement shown in FIG. 1.
FIG. 3 shows the heater-actuated transducer arrangement of FIGS. 1 and 2 in a pre-actuated configuration and an actuated configuration.

With reference to FIGS. 1-3, a slider 100 is shown supported by a suspension 101 in close proximity to a rotating magnetic storage medium 160. The slider 100 supports a transducer 103 and a heater 102 thermally coupled to the transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the transducer 103. This thermal expansion can be used to reduce the head-media spacing 107 in a data storage system. It is noted that, in some embodiments, a non-thermal actuator can be used to reduce the head-media spacing 107.

A thermal sensor 105 is shown situated on the transducer 103 at or near the close point. As discussed previously, actuation of the transducer 103 can be realized by a thermal actuator, such as the heater 102, or other actuator (e.g., a writer). In various embodiments, heat generated by the heater 102 (and sometimes in part by bias power applied to the thermal sensor 105) raises the surface temperature of the sensor 105 and adjacent portion of the transducer 103 to be substantially higher than the temperature of the magnetic storage medium 160. The thermal sensor 105 is configured to sense changes in heat flow for detecting onset of head-medium contact. Head-medium contact can be detected using a variety of techniques, such as comparing a magnitude change or rate of change of a thermal sensor signal to a threshold (e.g., an amplitude threshold, a rate of change threshold, percentage or an n-sigma change threshold).

As is depicted in FIG. 3, before head-medium contact, there is an air gap 107 defined between the hot head surface and the relatively cool disk 160. The transducer 103, air gap 107, and magnetic storage medium 160 define one level of heat transfer rate. When the transducer 103 is in contact with the disk 160, such as after activation of the thermal actuator or heater 102, the direct contact between the high thermal conductivity materials of the transducer 103 and the disk 160 significantly increases the heat transfer rate. As such, the thermal sensor 105 on the transducer 103 senses a drop of temperature or an excursion of temperature trajectory, allowing for detection of head-medium contact. Alternatively, the thermal sensor 105 can be cooled at reduced bias and witness a heating induced by friction upon contact.

Figure 4A:
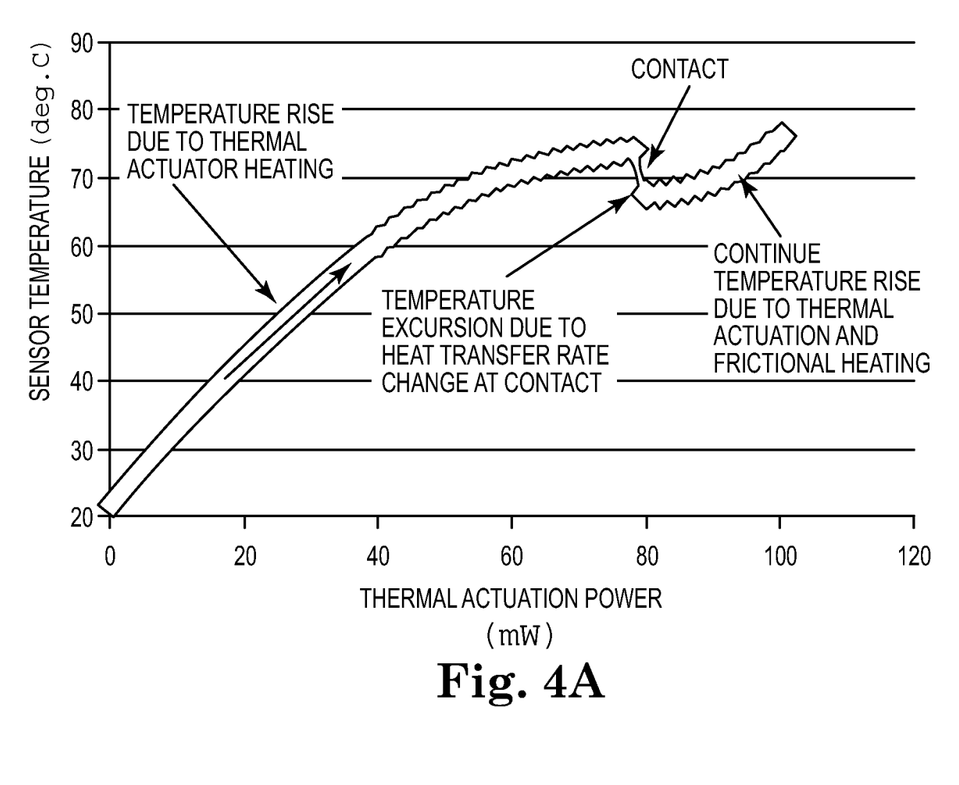
FIG. 4A illustrates a representative temperature profile for a heater-actuated transducer of the type shown in FIGS. 1-3 before, during, and after contact between the transducer and a surface of a magnetic storage medium.

FIG. 4A illustrates a representative temperature profile for a transducer 103 of the type shown in FIGS. 1-3 before, during, and after contact between the transducer 103 and a surface of the magnetic storage medium 160. In this illustrative example, the temperature profile is represented as a steady state DC signal due to the low- or non-modulation head-to-disk interface. When the transducer 103 is actuated by a thermal actuator 102, the transducer surface temperature will increase with the actuation due to the heat generated by the thermal actuator 102. The transducer temperature will be higher than the temperature of the disk 160. As such, the disk 160 acts as a heat sink in this scenario. When the transducer 103 contacts the disk 160, the transducer surface temperature will drop due to a change in heat transfer rate resulting from the contact. The transducer surface temperature will continue to increase due to thermal actuator heating and frictional heating. The change in temperature or excursion in temperature trajectory can be used to declare head-medium contact.

Figure 4B:
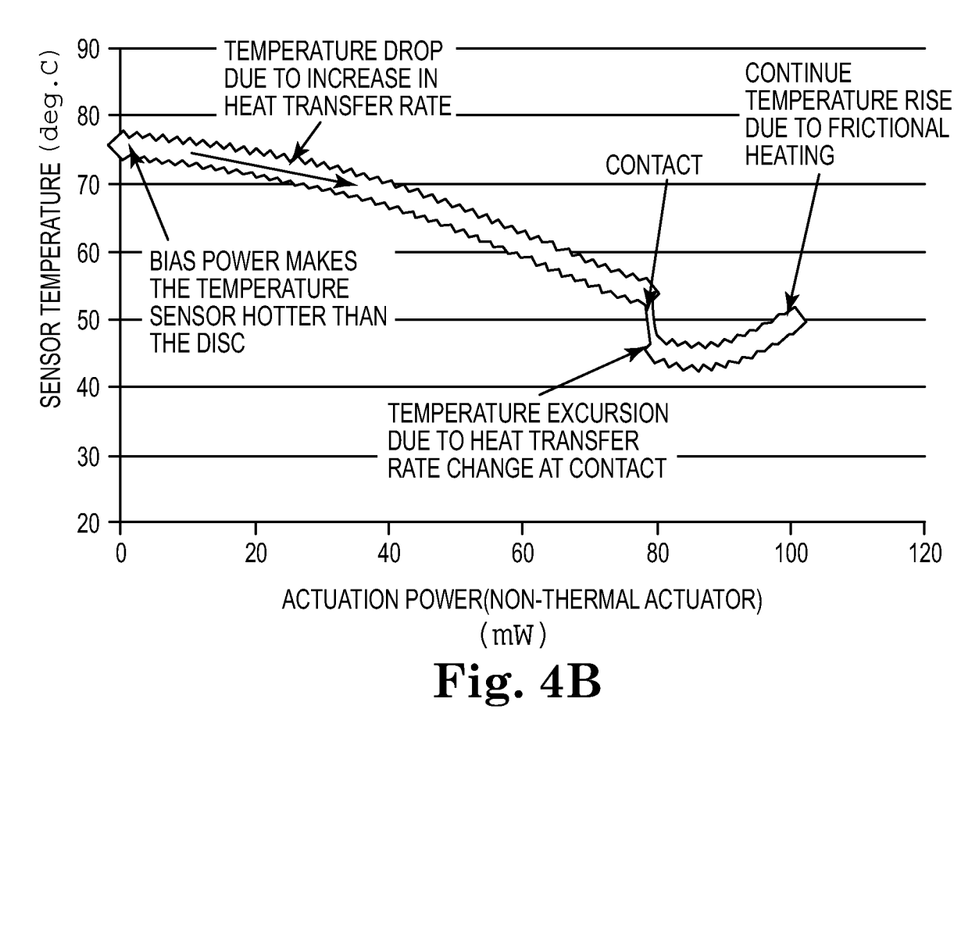
FIG. 4B illustrates a representative temperature profile for a non-thermal actuated transducer of the type shown in FIGS. 1-3 before, during, and after contact between the transducer and a surface of a magnetic storage medium.

FIG. 4B illustrates a representative temperature profile for a transducer 103 which is actuated by a non-thermal actuator. In this illustrative example, the thermal sensor 105 bias power self-heats the thermal sensor 105 to cause an increase in a temperature at the head-to-disk interface to be substantially higher than the temperature of the disk 160. The disk 160 acts as a heat sink in this scenario. When the transducer 103 is actuated down toward the disk 160, the heat transfer rate increases gradually, causing a gradual decrease in the temperature of the sensor 105. When the transducer 103 comes into contact with the disk 160, there will be a change in heat transfer rate, causing a transducer surface temperature excursion. The thermal sensor 105 on the transducer surface measures this temperature excursion to detect head-medium contact. Should further actuation into head-medium contact occur, the temperature will eventually increase due to frictional heating.

Embodiments of the disclosure relate to apparatuses and methods that utilize a transducer for interacting with a magnetic storage medium which includes at least two sensors configured to sense for one or more head-medium interface events. Embodiments are directed to apparatuses and methods that utilize a transducer for interacting with a magnetic storage medium which includes at least two sensors that operate cooperatively to sense for a head-medium interface event. Embodiments are directed to apparatuses and methods that utilize a transducer for interacting with a magnetic storage medium which includes at least two sensors that alternately serve as reference and active sensors for head-medium interface event detection.

In accordance with various embodiments, each of a multiplicity of sensors is coupled to a channel having parameters that can be adjusted independently from other channels. A representative, non-exhaustive list of channel parameters that can be adjusted for each channel includes bias, gain, and filtering parameters. In some embodiments, the multiplicity of adjustable channel parameters includes at least one of bias, gain, and filter parameters. In other embodiments, the multiplicity of adjustable channel parameters includes at least two of bias, gain, and filter parameters. In further embodiments, the multiplicity of adjustable channel parameters includes each of bias, gain, and filter parameters. In various embodiments, each of the parameters can be independently adjusted, and the parameters for a given channel can be independently adjusted. Each of the channels is coupled to a detector, which is configured to detect one or more head-medium interface events.

According to some embodiments, a first sensor can be located near the reader pole of the transducer and configured to detect thermal asperities and/or voids. A second sensor can be located near the writer pole and configured to detect head-medium contact and/or head-medium spacing. In some embodiments, a reader heater is used to thermally activate the reader, causing the reader pole and the first sensor to expand toward the surface of the medium to sense for thermal asperities and/or voids. A writer heater can be used to thermally activate the writer, causing the writer pole and the second sensor to expand toward the surface of the medium to sense for head-medium contact.

A typical transducer incorporates several distinct electrical and, in some implementations, optical components that require specified voltages/currents to operate properly. Representative examples of such electrical transducer components include a reader, a reader heater, a writer, and a write heater, among other possible components. Each of the electrically activated components of a transducer is electrically coupled to corresponding electrical contacts or bond pads of the transducer. Depending on the particular design of a given transducer, the head's various bond pads can be configured as voltage sources, current sources, or ground contacts.

Some embodiments are directed to a transducer which includes at least two thermal sensors (or other type of sensor), each of which is coupled between two bond pads. In such embodiments, four bond pads and four independent traces to make preamplifier/detector connections are needed for the two thermal sensors. Other embodiments are directed to a transducer which includes at least two thermal sensors (or other type of sensor), each of which is coupled between one bond pad and ground. In such embodiments, only two bond pads and two independent traces to make preamplifier/detector connections are needed for the two thermal sensors.

The need for four bond pads to support two thermal sensors is obviated by grounding one leg of each thermal sensor and using only two pads/traces to connect the remaining thermal sensor terminals to the detection circuit's preamplifier. This approach to connecting the thermal sensors is referred to as a ground-split approach, and can provide common-mode noise rejection advantages. Moreover, external thermal disturbances unrelated to contact or thermal asperity detection can be cancelled by combining the output of one thermal sensor, serving as a reference, and the other active thermal sensor (e.g., the thermal sensor actively sensing for head-medium contact, head-medium spacing, thermal asperities, or voids). The performance of head-medium contact or thermal asperity sensing/detection can be enhanced by provision of channels that provide for adjustment of channel parameters independently of other channels.

Figure 5:
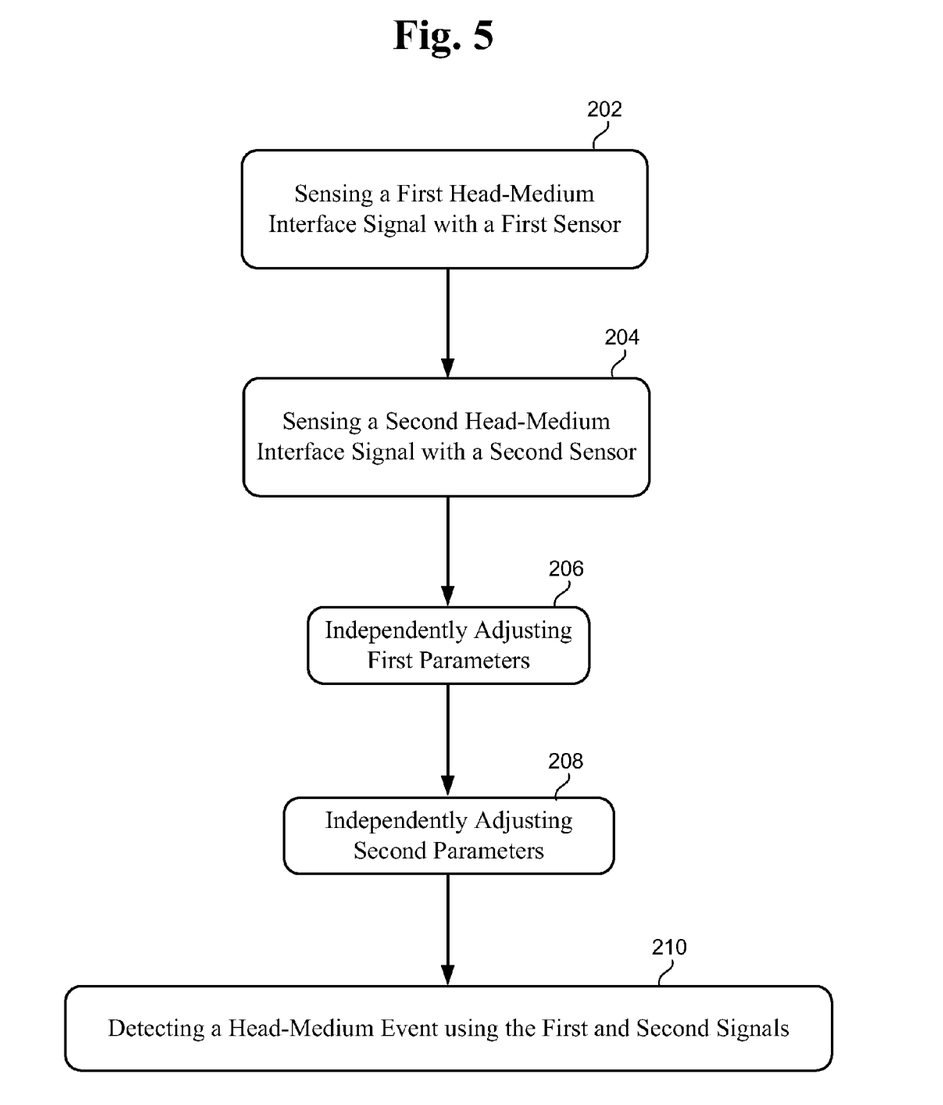
FIG. 5 is a flow chart showing various processes of a method for detecting a head-medium interface event using a pair of thermal sensors according to various embodiments.

In accordance with various embodiments, and with reference to FIG. 5, a representative detection method involves sensing 202, using a first thermal sensor coupled to a first channel, a first HMI signal. The detection method also involves sensing 204, using a second thermal sensor coupled to a second channel, a second HMI signal. A plurality of first parameters of the first channel are adjusted 206. Independent of the first channel, a plurality of second parameters of the second channel are adjusted 208. The method also involves detecting 210 an HMI event using the first and second HMI interface signals. In some embodiments, the plurality of first and second channel parameters includes one, two, or all of a bias, a gain, and filtering of the first and second channels, respectively.

Figure 6:
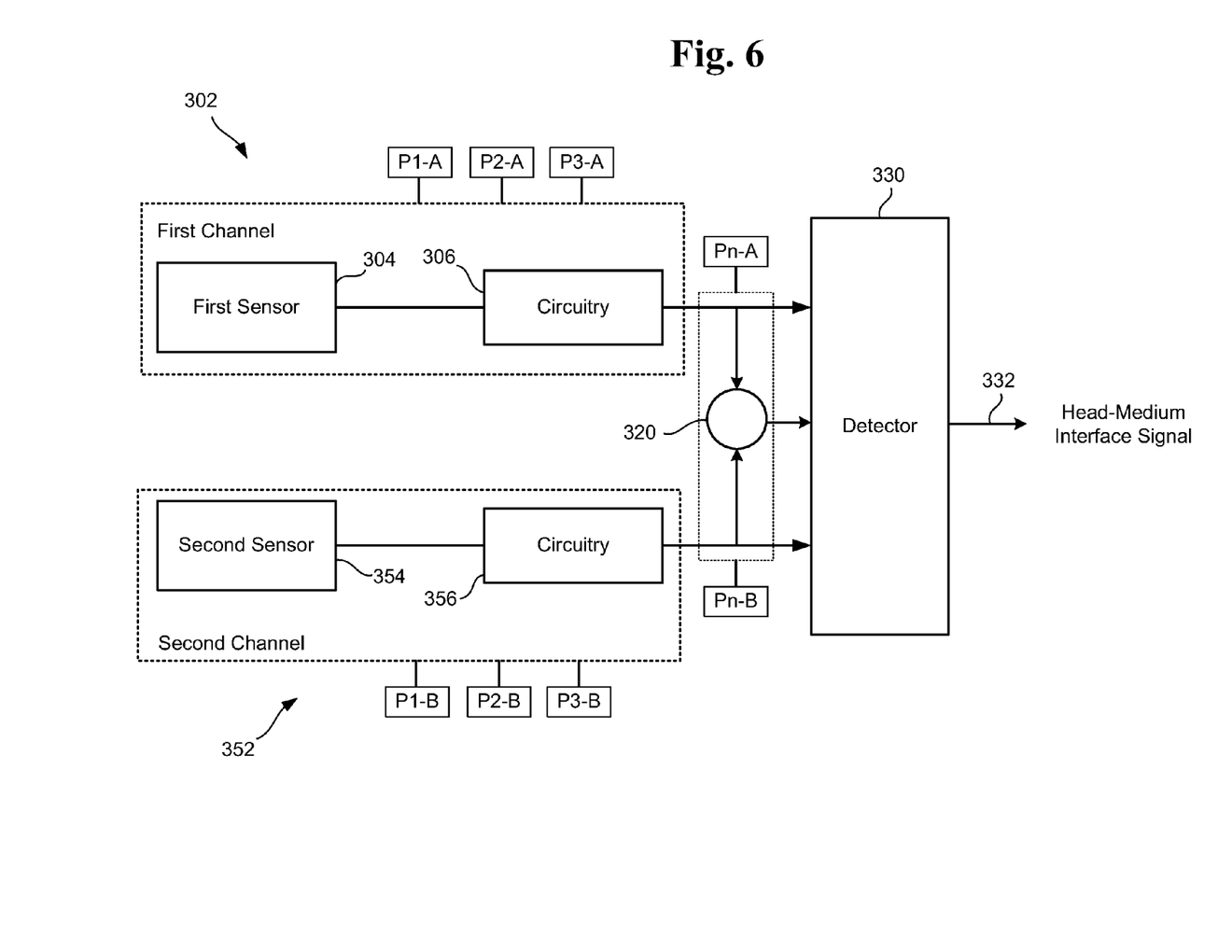
FIG. 6 is a block diagram of channel circuitry of a transducer in accordance with various embodiments.

FIG. 6 is a block diagram of channel circuitry of a transducer in accordance with various embodiments. The channel circuitry (in some embodiments, sensor channel circuitry) shown in FIG. 6 includes a first channel 302, a second channel 352, a detector 330, and a head-medium interface signal 332 at an output of the detector 330. The first channel 302 includes a first sensor 304, which may be implemented as a thermal sensor such as a TCR sensor. The second channel 352 includes a second sensor 354, which may be implemented as a thermal sensor such as a TCR sensor. Each of the first and second sensors 304 and 354 is coupled to respective first and second circuitry 306 and 356. The first and second circuitry 306 and 356 may include preamplifier circuitry configured to amplify and/or filter signals produced by the first and second sensors 304 and 354, respectively. The first and second circuitry 306 and 356 may be operably responsive to a plurality of adjustable parameters that alter the signals produced by the first and second sensors 304 and 354, such as in a manner that enhances detection of different types of HMI events (e.g., head-medium and thermal asperity contact events) by the detector 330.

According to various embodiments, the first and second channels 302 and 352 include a plurality of parameters that can be adjusted to enhance the sensor signals for detection by the detector 330. For example, the first channel 302 includes adjustable parameters P1-A, P2-A, P3-A, and Pn-A, and the second channel 352 includes adjustable parameters P1-B, P2-B, P3-B, and Pn-B, where n is an integer greater than 3. One or more of the adjustable parameters can influence operation of the first and second sensors 304 and 354. One or more of the adjustable parameters can influence operation of the preamplifier circuitry 306 and 356. One or more of the adjustable parameters can influence separation or mixing of the sensor signals prior to detection by the detector 330.

It can be appreciated that one or more operating characteristics of the first and second sensors 304 and 354 may not be the same. For example, two TCR sensors may not have the same resistance and, therefore, may require a different bias level. In one illustrative operating scenario, it may be desirable to intentionally make one of the first and second sensors 304, 354 more or less sensitive than the other, such as by adjusting the bias of one sensor independently of the other. In another illustrative operating scenario, it may be desirable to configure one of the sensors 304, 354 to serve as a reference for the other sensor. For example, one of the sensors 304, 354 may serve as a low-frequency reference point for the other sensor.

According to some embodiments, biasing of the first sensor 304 can be adjusted via adjustable parameter P1-A, and biasing of the second sensor 354 can be adjusted via adjustable parameter P2-A. In some implementations, adjustable parameters P1-A and P2-A define an adjustable bias current, while in other implementations, adjustable parameters P1-A and P2-A define an adjustable bias voltage. With independent biasing of the first and second sensors 304 and 354, low-frequency (external heating) rejection and common mode signal rejection can be enhanced or optimized.

In various embodiments, the gain of the first sensor 304 can be adjusted via adjustable parameter P2-A, and the gain of the second sensor 354 can be adjusted via adjustable parameter P2-B, for example. Independent gain adjustment of the first and second sensors 304 and 354 can be implemented for ground-split configurations and for a combined differential gain configuration.

In further embodiments, adjustable parameters P3-A and P3-B define filter parameters for adjusting filtering of sensor signals produced by the first and second sensors 304 and 354. Parameters P3-A and P3-B may, for example, represents an adjustable frequency band that is passed by a bandpass filter of the first and second channels 302 and 352. For example, the signal passband of an active sensor (e.g., first sensor 304) may be different from that of a reference sensor (e.g., second sensor 354). According to one illustrative operating scenario, during contact detection, it may be desirable to attenuate passband signals from the reference sensor (e.g., second sensor 354). This may be desirable because there will generally be some degree of correlation in the output signals from the active sensor (e.g., first sensor 304) and the reference sensor (e.g., second sensor 354). In addition or alternatively to a passband or bandwidth parameter, other adjustable filter parameters may be provided. A representative listing of adjustable filter parameters that may be provided include cutoff frequency, roll-off, transition band, ripple, and order of the filter, among others.

According to some embodiments, each of the first and second channels 302 and 352 may include an adjustable output control Pn-A and Pn-B, respectively. Adjustable output controls Pn-A and Pn-B allow for independent and combined signal processing and/or detection for each of the first and second sensors 304 354. In one representative operating scenario, output controls Pn-A and Pn-B can be adjusted to allow only signals from the first sensor 304 to pass to the detector 330. In another representative operating scenario, output controls Pn-A and Pn-B can be adjusted to allow only signals from the second sensor 354 to pass to the detector 330. In a further representative operating scenario, output controls Pn-A and Pn-B can be adjusted to allow signals from both the first sensor 304 and the second sensor 354 to pass to the detector 330. In yet another representative operating scenario, output controls Pn-A and Pn-B can be adjusted to allow signals from both the first sensor 304 and the second sensor 354 to pass to the detector 330 as a combined signal. In another illustrative operating scenario, output controls Pn-A and Pn-B can be adjusted to allow signals from one or both of the first and second channels 302 and 352 and a combined signal derived from the first and second channels 302 and 352 to pass to the detector 330.

According to some embodiments, a signal processing circuit 320 can be coupled to the first and second channels 302 and 352 and configured to operate on signals received from both the first and second sensors 304 at 354. The circuit 320 can be configured to perform one or more selectable operations including, for example, summing, subtracting, comparing, filtering, and/or other signal processing operations.

Independent operation of each of the first and second channels 302 and 352 provides the capability of operating each of the first and second sensors 304, 354 in a DC mode and for the combined output of both sensors 304, 354. DC operation is sometimes used for proximity detection, for example. By way of example, gamma, or a measure of reader and writer protrusion coefficients, can be determined by monitoring both the individual and combined DC outputs of the first and second sensors 304, 354.

In accordance with embodiments in which the first and second sensors 304, 354 are implemented using a ground-split configuration, some common mode signal interference will generally couple into the amplifiers of the first and second preamplifier circuitry 306 and 356. A benefit of grounding the first and second sensors 304, 354 is that the magnitude of the common mode excursions are reduced. This reduction in common mode excursions permits the use of amplifiers with lower dynamic range. Filtering, as discussed above, can be used to mitigate any remaining common mode signal interference.

Figure 7:
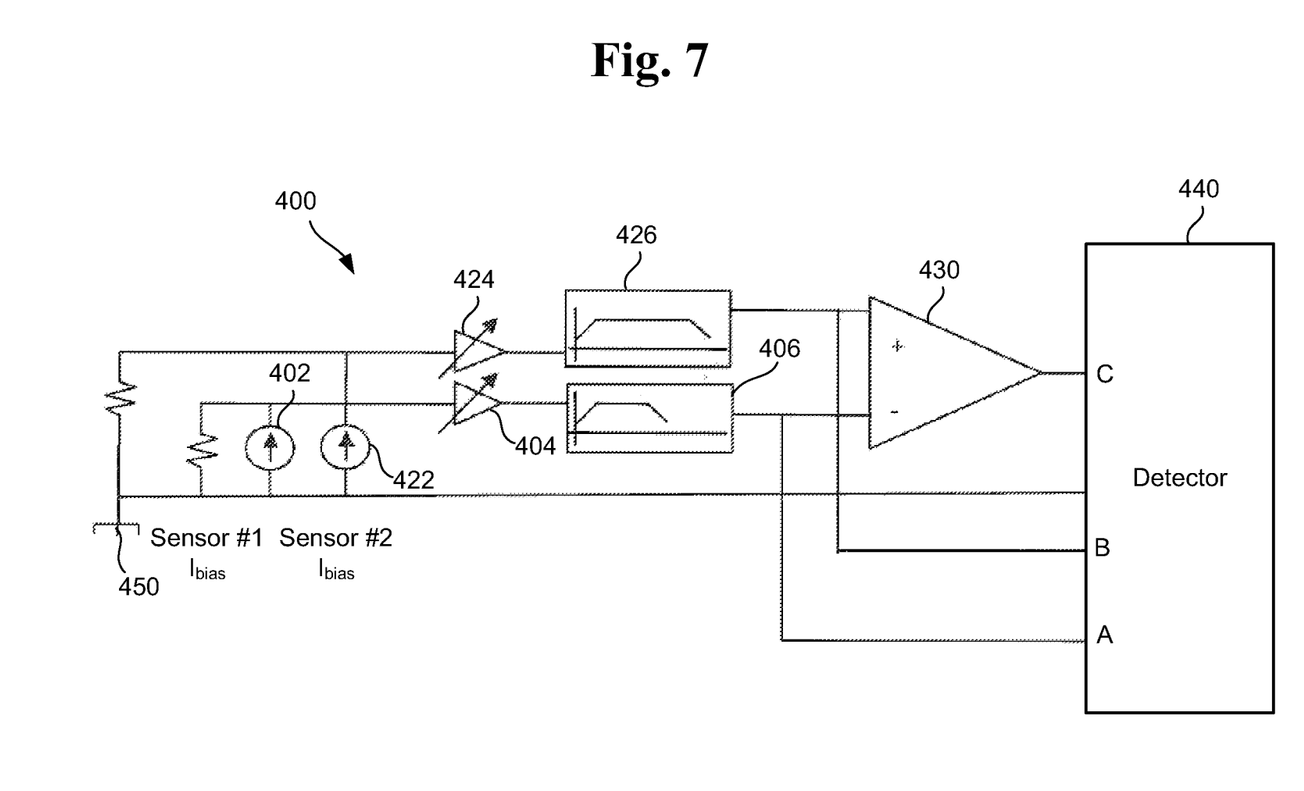
FIG. 7 shows a schematic of circuitry for detecting a head-medium interface event in accordance with various embodiments.

FIG. 7 shows a schematic of circuitry 400 for detecting head-medium interface events in accordance with various embodiments. The circuitry 400 includes a first sensor 402 and a second sensor 422, each of which is independently biased by a bias current source. The first sensor 402 is coupled to preamplifier circuitry which includes a variable gain amplifier 404 and a first filter 406. The second sensor 422 is coupled to preamplifier circuitry which includes a variable gain amplifier 424 and a second filter 426. As was previously discussed, the gain and filter response characteristics of the respective variable gain amplifiers 404, 424 and filters 406, 426 can be independently adjusted.

In the embodiment shown in FIG. 7, outputs of the first and second filters 406 and 426 are coupled to respective inputs of a difference amplifier 430. In general terms, the difference amplifier 430 is configured to amplify a difference between sensor signals presented at its positive and negative inputs (i.e., differential-mode gain), and attenuate content that is common to both sensor signals (i.e., common-mode rejection). An output of the difference amplifier 430 is coupled to an input of a detector 440. Outputs of the first and second filters 406 and 426 are also coupled to respective inputs of detector 440 in a manner which bypasses the difference amplifier 430.

The connection configuration of the circuitry illustrated in FIG. 7 provides the detector 440 with three distinct signal inputs; independent sensor signals produced by first sensor 402 and second sensor 422 presented at inputs A and B, respectively, and a combined (e.g., difference) sensor signal presented at inputs C. It is noted that in some embodiments, the detector 440 is configured to perform additional filtering and signal processing on any of the signals presented at its inputs A, B, and C. It is further noted that one or more of the preamplifier circuitry (e.g., variable gain amplifiers, filters) and the difference amplifier 430 can be integral to, or separate from, the detector 440, and that the specific circuit diagram shown in FIG. 7 is for purposes of illustration and not of limitation.

In some embodiments, the first and second sensors 402 and 422 can be implemented as resistance thermal sensors having different signs of TCR, one positive and the other negative. The signals produced by the first and second sensors 402 and 422 can be summed by difference amplifier 430 to produce a combined output signal indicative of one or more head-medium interface events. In other embodiments, the first and second sensors 402 and 422 can have the same signs of TCR, and the difference amplifier 430 can be configured to produce a combined output signal indicative of one or more head-medium interface events. In some embodiments, the first and second sensors 402 and 422 can be arranged to define a differential resistance thermal sensor. The circuitry shown in FIG. 7 can be configured to combine the first and second sensor signals to produce a differential signal indicative of one or more head-medium interface events.

Figure 8:
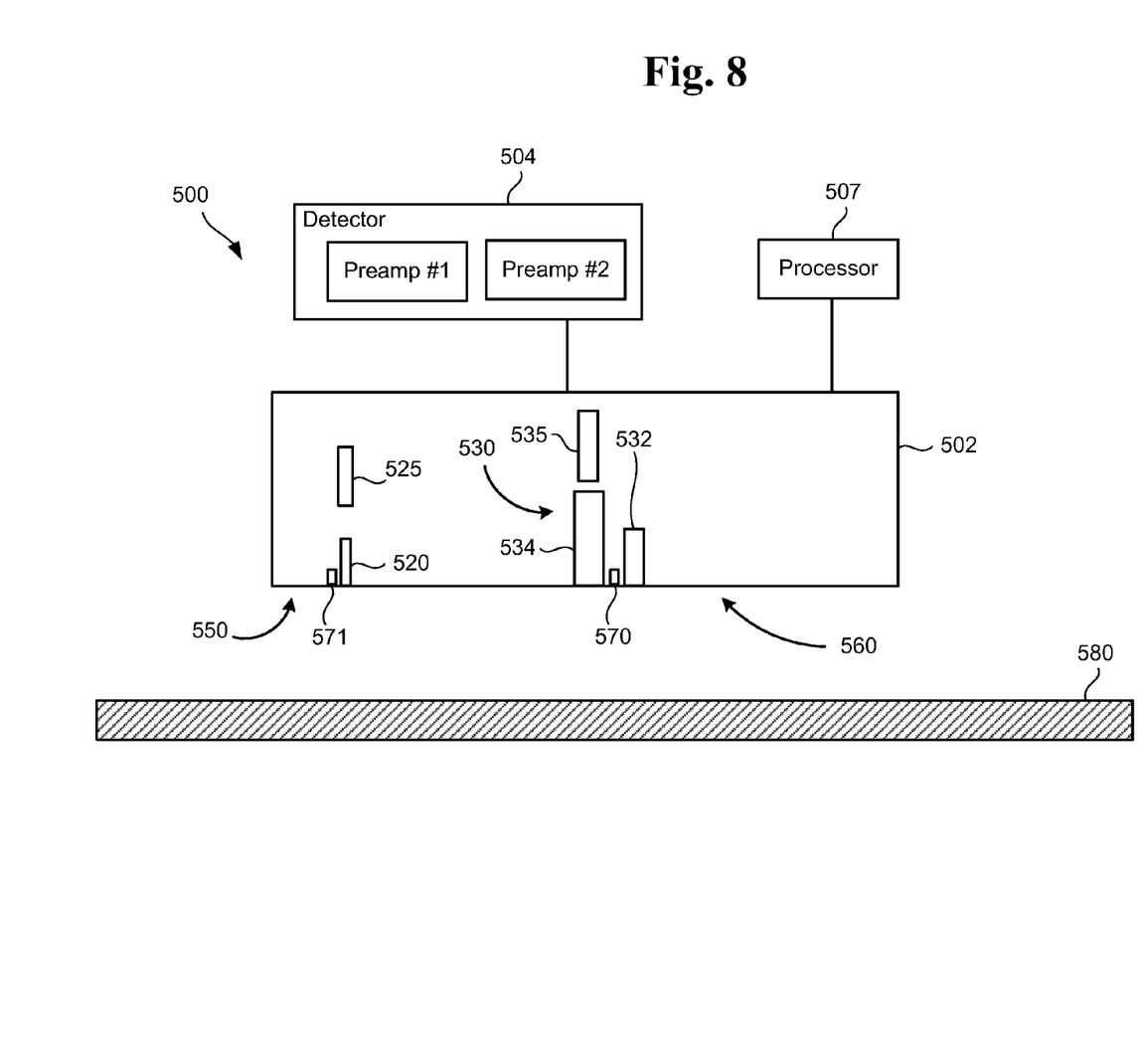
FIG. 8 illustrates a transducer arrangement for detecting a head-medium interface event in accordance with various embodiments.

Turning now to FIG. 8, there is illustrated a transducer arrangement 500 for detecting head-medium interface events in accordance with various embodiments. The transducer arrangement 500 includes a recording transducer 502 comprising a slider 550 positioned proximate a rotating magnetic medium 580. The surface of transducer 502 facing the magnetic medium 580 includes an air bearing surface (ABS) 560. The transducer 502 includes a reader 520 and a writer 530 proximate the ABS 560 for respectively reading and writing data from/to the magnetic medium 580. The writer 530 includes a writer pole 532 and a writer return pole 534. Situated proximate the writer 530 is a writer heater 535, and situated proximate the reader 520 is reader heater 525 according to various embodiments. Each of the heaters 525, 535 is thermally coupled to transducer 502 and may be a resistive heater that generates heat as electrical current is passed through the heaters 525, 535. The heaters 525, 535 are not limited to resistive heaters, and may include any type of heating source.

At or near the ABS 560 and proximate the writer 530 is a thermal sensor 570. Also at or near the ABS 560 and proximate the reader 520 is a thermal sensor 571. Thermal sensors 570 and 571 can be implemented as resistance thermal sensors composed of materials having a temperature coefficient of resistance. When implemented as TCR sensors, thermal sensors 570 and 571 measures temperature change by measuring the change in resistance, or rate of change in resistance, across the sensor. The thermal sensors 570 and 571 measure the temperature change at the ABS 560 induced by all thermal condition changes from air pressure, clearance, head operation, and head-media and thermal asperity contact, among other changes.

As discussed previously, one of the thermal sensors 570, 571 can be configured to sense for head-medium contact, while the other thermal sensor is configured to sense for thermal asperities and/or voids. When one of the thermal sensors 570, 571 is actively sensing, the other thermal sensor can be configured to serve as a reference for the active thermal sensor. In some embodiments, a third thermal sensor (e.g., a reference thermal sensor, not shown) may be located away from the heat sources of the transducer and the ABS 560, allowing for differential temperature measurements to be made with respect to the active thermal sensor 570 or 571. It is noted that concurrent sensing of head-medium contact, head-medium spacing, thermal asperities, and voids can be achieved using active thermal sensors 570 and 571 and a third reference thermal sensor.

Figure 9:
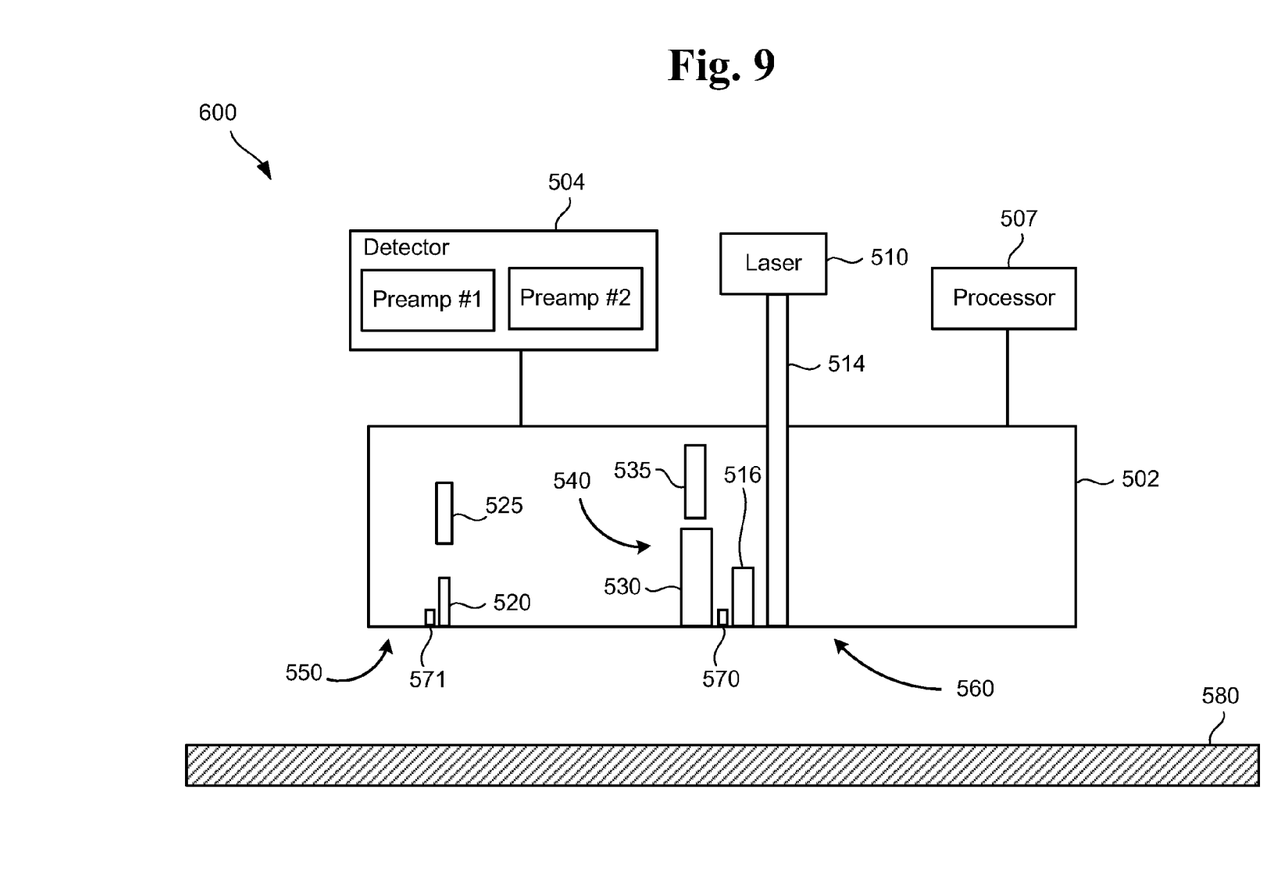
FIG. 9 shows a transducer arrangement for detecting a head-medium interface event in accordance with various embodiments.

FIG. 9 shows a transducer arrangement 600 for detecting head-media and thermal asperity contact in accordance with various embodiments. The transducer arrangement 600 of FIG. 9 is configured for heat assisted magnetic recording (HAMR), also referred to as thermally assisted magnetic recording (TAMR). In the embodiment illustrated in FIG. 9, a writer 540 is configured for heat assisted magnetic recording and is located proximate a near-field transducer (NFT) 516. The NFT 516 is optically coupled to a light producing arrangement which includes a light source 510 (e.g., laser diode). The light source 510 can be mounted external, or integral, to the transducer 502. The light source 510 energizes the NFT 516 via a waveguide 514 proximate the ABS 560 and writer 530, respectively.

Heat assisted magnetic recording according to the embodiment shown in FIG. 9 is facilitated by the laser 510 and the waveguide 514 cooperating to deliver optical energy to the near-field transducer (NFT) 516. The laser 510, waveguide 514, and NFT 516 cooperate to deliver heat to a small spot on a magnetic recording media (e.g., hard disk) 580 in order to overcome superparamagnetic effects that would otherwise limit the areal data density of typical magnetic media. When writing to a HAMR medium 580, plasmon resonance energy produced by the NFT 516 is concentrated at a small hotspot over the track where writing takes place.

The NFT 516 is a near-field optics device designed to reach local surface plasmon resonance at a designed wavelength of light. The waveguide 514 and/or other optical element concentrates laser light on a transducer region (e.g., focal region) where the NFT 516 is located. The NFT 516 is designed to achieve surface plasmon resonance in response to this concentration of light. At resonance, a high electric field surrounds the NFT 516 due to the collective oscillations of electrons at the metal surface. Part of this field will tunnel into the magnetic recording medium 580 and get absorbed, thereby raising the temperature of a spot on the medium 580 to the Curie temperature as the spot is subject to recording.

According to some HAMR transducer embodiments, the thermal sensor 570 is situated near the NFT 516, which is typically the component that produces the greatest amount of heat at the transducer 502. In some embodiments, the thermal sensor 570 is configured to operate in thermal environments exceeding 200° C. In other embodiments, the thermal sensor 570 is configured to operate in thermal environments exceeding 220° C. In further embodiments, the thermal sensor 570 is configured to operate in thermal environments exceeding 250° C. (e.g., up to about 400° C.).

Figure 10:
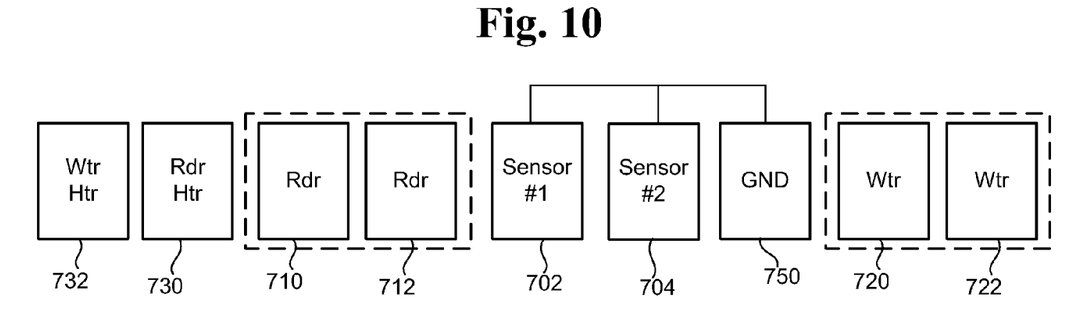
FIG. 10 illustrates an arrangement of bond pads provided at appropriate locations in/on a transducer in accordance with a ground-split configuration.

According to some embodiments, the thermal sensors of a transducer can be powered using a ground-split configuration, which utilizes only one bond pad per thermal sensor as previously described hereinabove. FIG. 10 illustrates an arrangement of bond pads that are provided at appropriate locations in/on a transducer in accordance with a ground-split configuration. The arrangement of bond pads shown in FIG. 10 includes a single bond pad 702 for a first thermal sensor, and a single bond pad 704 for a second thermal sensor. In embodiments where more than two thermal sensors are employed, a single bond pad is provided for each additional thermal sensor. In accordance with a ground-split configuration, one end of each thermal sensor is connected to a respective bond pad 702, 704, and the other end of each thermal sensor is connected to a ground pad 750 or other location of the transducer other than a bond pad. Other bond pads shown in FIG. 10 include a pair of bond pads 710, 712 for a reader, a pair of bond pads 720, 722 for a writer, a bond pad 730 for a reader heater, and a bond pad 732 for a writer heater.

Figure 11:
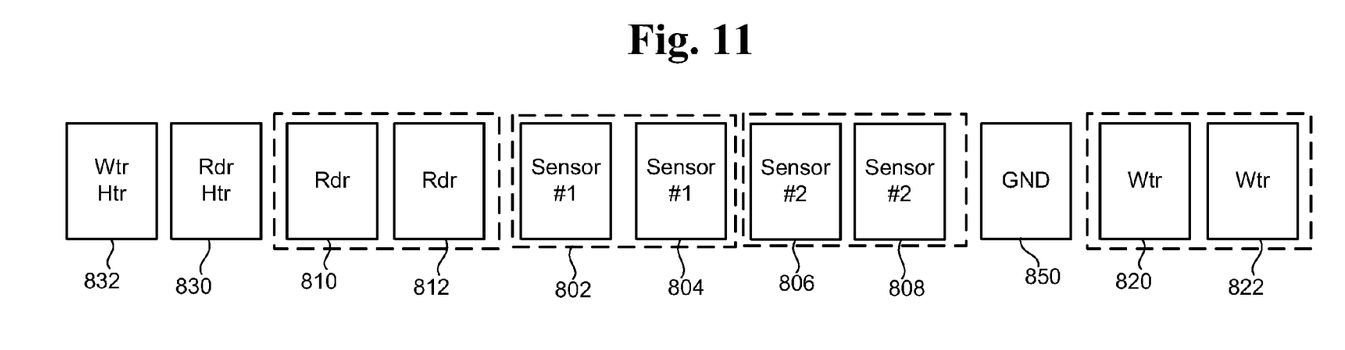
FIG. 11 illustrates an arrangement of bond pads provided at appropriate locations in/on a transducer in accordance with a dual-ended configuration.

According to other embodiments, the thermal sensors of a transducer can be powered using a dual-ended configuration, which utilizes two bond pads per thermal sensor as previously described hereinabove. FIG. 11 illustrates an arrangement of bond pads that are provided at appropriate locations in/on a transducer in accordance with a dual-ended configuration. The arrangement of bond pads illustrated in FIG. 11 includes a pair of bond pads 802, 804 for a first thermal sensor and a pair of bond pads 806, 808 for a second thermal sensor. In embodiments where more than two thermal sensors are employed, a pair of bond pads is provided for each additional thermal sensor. The remaining bond pads shown in FIG. 11 include a pair of bond pads 810, 812 for a reader, a pair of bond pads 820, 822 for a writer, a bond pad 830 for a reader heater, and a bond pad 832 for a writer heater.

Referring again to FIGS. 8 and 9, these illustrative embodiments include a detector 504 and dedicated preamplifiers #1 and #2 communicatively coupled to the thermal sensors 570 and 571, respectively. Each of the thermal sensors 570 and 571 is coupled to a dedicated channel which includes a dedicated preamplifier, preamplifier #1 and #2, respectively. Each of the dedicated channels has parameters that can be adjusted independently from other channels, such channel parameters including bias, gain, and filtering parameters. Each of the channels is coupled to the detector 504, which is configured to detect one or more head-medium interface events. The detector 504 and preamplifiers #1 and #2 can incorporate some or all of the components and functionality described previously with respect to FIGS. 5-7.

The apparatuses of FIGS. 8 and 9 are further shown to include a controller or processor 507 according to various embodiments. The processor 507 can be configured to perform a variety of functions, including controlling power delivery to reader and writer heaters 525 and 535, and to the laser 510 shown in FIG. 9. In some embodiments, the processor 507 is configured to adjust power supplied to one or more of the reader heater 525, the writer heater 535, and the laser 510 for purposes of adjusting fly height of slider 550 relative to magnetic storage medium 580. In some embodiments, the processor 507 can be coupled to thermal sensor detector 504 and configured to measure transducer temperature, from which head-media separation, head-medium contact, thermal asperity contact, and voids can be measured/detected in accordance with various embodiments.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a transducer configured to interact with a magnetic storage medium;
   a first channel comprising a first sensor and first circuitry configured to adjust a plurality of first channel parameters;
   a second channel comprising a second sensor and second circuitry configured to adjust a plurality of second channel parameters, the first and second channel parameters independently adjustable by the first and second circuitry; and a detector coupled to the first and second channels, the detector configured to detect a head-medium interface event.

2. The apparatus of claim 1, wherein the first and second sensors are configured as thermal sensors each having a temperature coefficient of resistance.

3. The apparatus of claim 1, wherein:
the first sensor is configured to sense for head-medium clearance and contact; and
the second sensor is configured to sense for thermal asperities or voids.

4. The apparatus of claim 1, wherein:
the transducer comprises a reader and a writer;
the first sensor is situated proximate the reader; and
the second sensor is situated proximate the writer.

5. The apparatus of claim 1, wherein:
the transducer comprises a reader, a reader heater, a writer, and a writer heater;
the first sensor is situated proximate the reader; and
the second sensor is situated proximate the writer.

6. The apparatus of claim 1, wherein:
the transducer comprises a reader, a writer, a near-field transducer proximate the writer, and a waveguide configured to communicate light from a light source to the near-field transducer;
the first sensor is situated proximate the reader; and
the second sensor is situated proximate the writer.

7. The apparatus of claim 1, wherein the first and second channel parameters comprise one or more of a bias parameter, a gain parameter, and a filtering parameter.

8. The apparatus of claim 1, wherein:
the transducer comprises a plurality of bond pads each serving as a voltage or current source contact;
the first sensor comprises a first end coupled to a first bond pad and a second end coupled to a ground; and
the second sensor comprises a first end coupled to a second bond pad and a second end coupled to the ground.

9. The apparatus of claim 1, wherein:
the transducer comprises a plurality of bond pads each serving as a voltage or current source contact;
the first sensor comprises a first end coupled to a first bond pad and a second end coupled to a second bond pad; and
the second sensor comprises a first end coupled to a third bond pad and a second end coupled to a fourth bond pad.

10. The apparatus of claim 1, wherein the first sensor serves as a reference for the second sensor.

11. The apparatus of claim 1, wherein:
the first channel circuitry comprises a first filter;
the second channel circuitry comprises a second filter; and
the detector comprises preamplifier circuitry configured to adjust a response of the first and second filters to account for common mode signal interference.

12. The apparatus of claim 1, wherein the detector comprises or is coupled to a difference amplifier having an output, a first input coupled to the first channel, and a second input coupled to the second channel.

13. The apparatus of claim 1, wherein:
the detector comprises:
a first input coupled to the first channel;
a second input coupled to the second channel;
a third input; and
an output where a signal indicative of a head-medium interface event is provided; and the apparatus further comprises a signal processing circuit comprising:
a first input coupled to the first channel;
a second input coupled to the second channel; and
an output coupled to the third input of the detector.

14. An apparatus, comprising:
a transducer configured to interact with a magnetic storage medium and comprising a plurality of bond pads, each of the bond pads serving as a voltage or current source contact;
a first sensor having a temperature coefficient of resistance and comprising a first end and a second end, the first end coupled to a first bond pad and the second end coupled to ground;
a second sensor having a temperature coefficient of resistance and comprising a first end and a second end, the first end of the second sensor coupled to a second bond pad and the second end of the second sensor coupled to ground; and
preamplifier circuitry comprising first channel circuitry coupled to the first sensor and second channel circuitry coupled to the second sensor, the first channel circuitry configured to provide adjustment of a plurality of first channel parameters and the second channel circuitry configured to provide adjustment of a plurality of second channel parameters, the first and second channel parameters independently adjustable by the first and second circuitry; and
a detector coupled to the preamplifier circuitry and configured to detect one or more head-medium interface events.

15. The apparatus of claim 14, wherein each of the first and second circuitry is configured to adjust a bias, a gain, and filtering of the first and second channels, respectively.

16. The apparatus of claim 14, wherein:
the first sensor is configured to sense for head-medium contact and clearance; and
the second sensor is configured to sense for thermal asperities and voids.

17. The apparatus of claim 14, wherein the preamplifier circuitry is configured to select between single or combined first and second sensor signal output of signals to the detector.

18. The apparatus of claim 14, wherein:
each of the first and second sensors is operable in a DC mode; and
the preamplifier circuitry is configured to select between single or combined first and second sensor signal output of signals to the detector.

19. A method, comprising:
sensing a first head-medium interface signal with a first thermal sensor coupled to a first channel;
sensing a second head-medium interface signal with a second sensor coupled to a second channel;
adjusting first parameters of the first channel;
adjusting second parameters of the second channel independently of adjusting the first parameters; and
detecting a head-medium interface event using the first and second head-medium interface signals.

20. The method of claim 19, wherein adjusting the first and second parameters comprises adjusting a bias, a gain, or filtering of the first and second channels.

* * * * *